[Patent No.] 3,454,324
[Patented] July 8, 1969

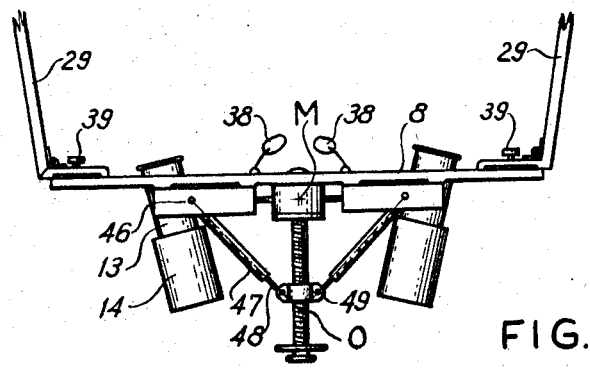
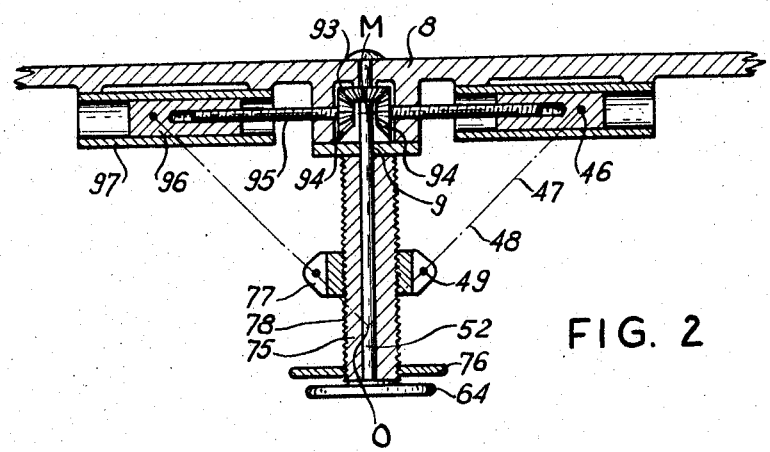
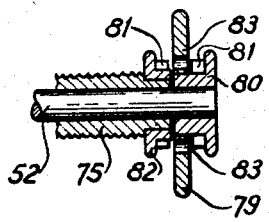 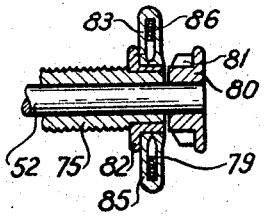 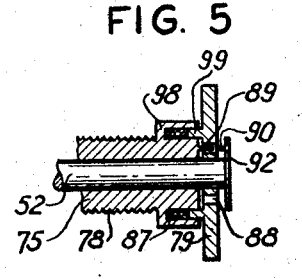
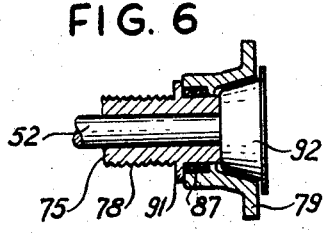

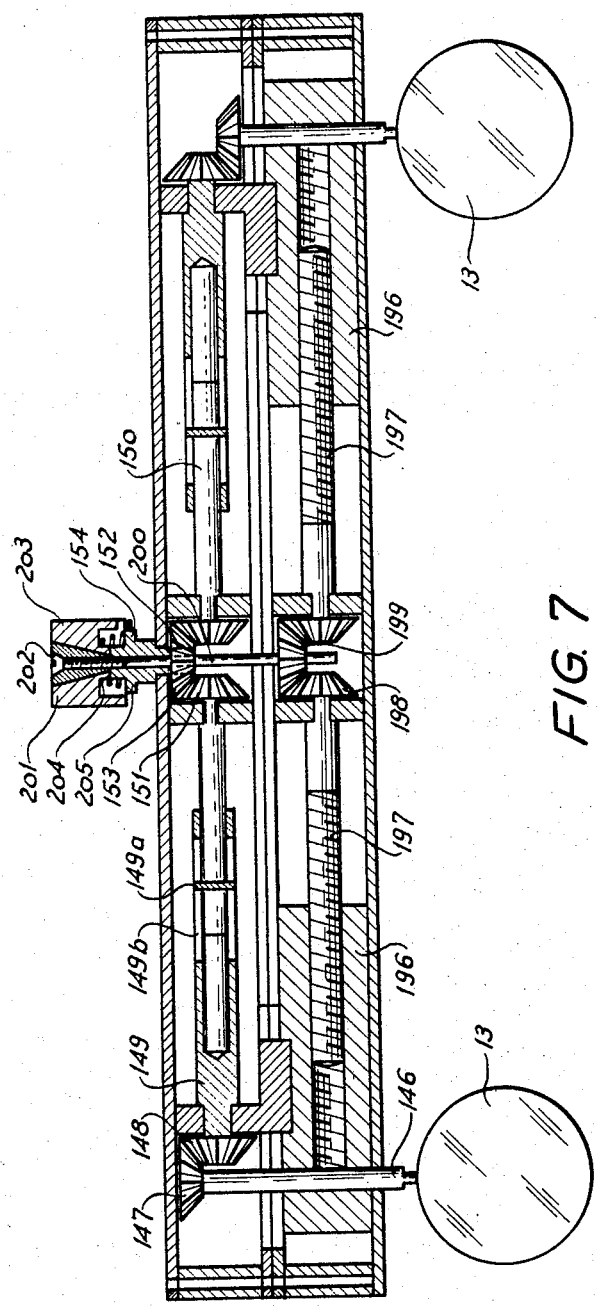

3,454,324
BINOCULAR LOUPE SELECTIVE AND COLLECTIVE INTEROCULAR AND CONVERGENCE ADJUSTMENT MEANS
Arno Gustav Schmidt, 224 E. 96th St., New York, N.Y. 10028
Filed Dec. 12, 1963, Ser. No. 330,065
Int. Cl. G02b 7/06, 7/12
U.S. Cl. 350—146      3 Claims

ABSTRACT OF THE DISCLOSURE

The invention relates to a bi-optical loupe having means collectively and selectively operable to vary the angle of convergence and pupillary distance.

---

This invention relates in general to bi-optical loupes, and in particular to a bi-optical louple having simplified means for quickly adjusting its power, pupillary spacing and angular convergence. The invention provides improved operation of the structure illustrated in my Patent No. 3,029,696.

It is an object of the invention to provide means for varying the pupillary distance without varying the angle of convergence, and vice versa.

It is a further object of the invention to provide means for independently adjusting the angle of convergence and the pupillary distance, i.e. vary one without changing the other.

Another object of the invention is to provide a unitary control which may selectively vary either the angle of convergence or the pupillary distance.

Further objects and features of the invention reside in the combination and arrangement of parts involved in the embodiment of the invention as illustrated and as will be understood by the following description and accompanying drawings wherein:

FIG. 1 is a plan view of a bi-optical loupe embodying my invention;

FIG. 2 is a slightly enlarged sectional plan view of a portion of the bi-optical louple illustrated in FIG. 1;

FIGS. 3, 4, 5 and 6 show other embodiments for coupling the pupillary spacing control with the angle of convergence control; and FIG. 7 is a sectional elevation of another embodiment of the invention.

Referring to FIGS. 1 and 2, the complete optical loupe comprises a frame 8 having adjustable temples 29. The eye loupes are composed of the eye piece 13 and barrel portions 14. The eye peice 13 is pivotally mounted at 46 in a slide 96. Secured to the barrel 13 at the pivot 46 is an arm 47 telescopically receiving an extension 48 pivotally mounted at 49 to nut 77 threaded about a sleeve 75 rotatably mounted on the shaft 52. The shaft 52 is itself rotatably mounted in frame member 8 and the journal 9. Fixedly secured to the shaft 52 is a bevel gear 93 meshed with the bevel gears 94 to provide a right angular drive to the screws 95 secured to gears 94 and threaded in the slides 96. Since bevel gears 94 are spaced 180° around gear 95, they rotate in opposite directions and the threads of screws 95 are therefore of the same hand to move slides 96 toward and away from each other. A knurled hand wheel 76 is secured on the sleeve 75 while another hand wheel 76 is secured in central shaft 52.

The pitch of the threads on the screws 95 are equal to each other and equal to the pitch of the thread 78 on the sleeve 75. The hand or sense of rotation of all threads is the same. As illustrated all threads are of the left hand.

OPERATION

Rotation of the wheel 64 with the shaft 52 rotates bevel gears 93, 94 and screw 95 to displace the slides 96 and the pivot points 46 toward and away from each other to provide a predetermined desired pupillary spacing. Rotation of the wheel 76 will rotate the sleeve 75. Since the nut 77 threaded on the sleeve cannot rotate, it will be moved axially of the sleeve 75, thereby varying the angle of convergence of the optical loupes.

When it is desired to vary the pupillary distance without changing the angles of convergence, it is merely necessary to conveniently grip both wheels 64 and 76 and rotate them together. The rotation of the wheel 64 to the right, for example, will move the slides 96 toward each other and the equal and simultaneous rotation of the wheel 76 would move the nut 77 away from the wheel 76 (since thread 78 is of the left hand). Since all threads are of the same pitch (as are the gears 93 and 94), the movement of the nut 77 upwardly (FIGS. 1, 2) would equal the movement of each slide 96 to maintain a constant angle of convergence.

This last is apparent if one consider the triangule O–M–46. This is a right triangle having equal sides O–M and M–46 within a practical range. The pupillary distance may be varied without varying the angle of convergence. When the basic form of the triangle is varied, relative movement of the slides 96 and the nut 77 will be varied as the tangent of the angle M–46–O. Thus, if the distance OM is but half the distance M46, then for one rotation of the wheel 64 the slide 46 should move twice the distance as does the nut 77 for one rotation of the wheel 76. This result can be obtained either by changing the ratio of the bevel gear 93 to the bevel gears 94 or pitch of the thread of screws 95, or a combination of both.

It frequently becomes desirable to change the angle of convergence without changing the pupillary distance. In order to differentially or collectively operate the shaft 52 and the sleeve 75, several embodiments are provided in FIGS. 3–6.

In FIG. 3, collar 82 is secured to shaft 75 and collar 80 is secured to shaft 52. Each of the collars 80, 82 have the formed notches 81 which may be formed, for example, as commercial gear rims. The knurled ring 79 is loosely mounted on a reduced portion of the collar 80 and has internal teeth 83 complementary to the notches 81 of the collars 80 and 82. Knurled ring 79 may be moved to the right as illustrated so that it is in engagement with the collar 80 only or the left so that it is in engagement with the collar 82 only. When it is in engagement with the collar 82 the finger of the operator may rotate both the ring 79 and the collar 80 for a collective movement of the two shafts 52 and 75.

FIG. 4 shows another variation in which the wheel 79 has recesses 85 to receive radially movable teeth or pins 83 urged inwardly by the spring 86. The pins 83 have a bevel as do the ends of the lands between the notches 81. Thus the wheel 79 may be forced axially from the collar 80 to the collar 82 but the bevel is not steep enough to permit raising of the pins 83 in a rotary direction when they are engaged in a notch 81.

FIGS. 5 and 6 show a structural modification of the wheel 79 such that the wheel is always in driving connection with the collar shaft 75 but may be selectively disengaged from the shaft 52 controlling the pupillary distance.

Referring to FIG. 5, the wheel 79 has an annular rim 99 engaged in a complementary annular spring cage 98 formed on the shaft 75. Compression spring 87 tends to urge the wheel 79 axially to the right. The wheel 79 is further provided with holes 88 which receive pins 89 extending from the shaft 75. Collar 92 provided on the end of shaft 52 carries pins 90 also in alignment which may also be engaged in the holes 88. The pins 89 are of sufficient length that in any axial position of wheel 79 they are engaged in holes 88. However, the pins 90 on the collar 92 are shorter so that when the wheel 79 is moved to the left against the urge of the spring 87 the driving connection with the wheel 79 and the shaft 52 is disengaged. Somewhat similar structure is shown in FIG. 6 in which the wheel 79 is actually slidable but not rotatably mounted on the shaft 75. Here the collar 92 is formed as a cone which may be frictionally engaged by a complementary internal cone on the wheel 79. Spring 87 urges the wheel 79 into frictional driving connection with the collar 92.

In FIG. 7, the eye pieces are secured to rotatable shafts 146 carrying beveled pinions 147 in engagement with pinions 148 on shaft 149. Shaft 150 is slidable in shaft 149 but rotates therewith by virtue of the pin 149a. Pin 149a passes through shaft 150 and engages at its ends the slot 149b. To the medial end of shaft 149, 150 are beveled pinions 151 engaged by the beveled pinion 152 mounted on a reduced portion 153 of hollow shaft 154. Shafts 146 are revolvably mounted in slides 196 pivoted on the shaft 197 to which is secured a beveled pinion 198 engaged by the beveled pinion 199 secured on a shaft 200. To the end of shaft 200 a conical collar 201 is secured by means of a screw 202. The knob 203 is slidably mounted on the shaft 154 and is urged upwardly by the compression spring 204 caged in the knob 203 and bearing against a flange 205 on the shaft 154. In the position shown in FIG. 7, rotation of the knob 203 will rotate both shafts 200 and shaft 154. When the knob, however, is moved axially it loses frictional engagement with the cone member 201 and, accordingly, its rotation drives only the hollow shaft 154. Rotation of the shaft 154 through the bevel gearing and shafts 149, 150 will change the angle of convergence of the eye pieces 13. Rotation of the shaft 200 through its bevel gearing 199, 198 will move the slides 196 inwardly or outwardly. Both the left and right shafts 197 are of the same hand and consequently rotation of the shaft 200 will move the eye pieces 13 toward or away from each other.

I claim:
1. A bi-optical loupe frame for the support of two eye loupes comprising, in combination, a horizontally displaced frame member adapted to span the eyes, supporting means to secure said frame member to the user, mounting means slidable along said frame and pivotally supporting said eye loupes, an elongated member mounted to extend from said frame member and rotatable about its own axis, a threaded collar shaft rotatably mounted about said elongated member about an axis coextensive with the rotation axis of said elongated shaft, a device threaded on said collar shaft, said elongated member being drivingly coupled to said slidable means so that rotation thereof moves said mounting means to vary the distance between said eye loupes, telescopic links pivotally securing said device to said eye loupes to vary the convergence of said eye loupes when said device is moved axially along said threaded collar shaft when said shaft is rotated, a first mechanism secured to said elongated member, a second mechanism adjacent said first mechanism secured to said threaded shaft, and means adapted to be manipulated to selectively and collectively rotate said mechanisms, said last mentioned means having a coupled position and an uncoupled position between said mechanisms and arranged so that each of said first and said second mechanisms is separably operable and rotatable when in an uncoupled position and is collectively operable and rotatable in a coupled position whereby the distance between said eye loupe and the convergence of said loupe may be selectively varied and conjointly collectively varied in a constant predetermined ratio to each other.

2. A device as set forth in claim 1, further characterized in that the drive between said elongated member and said sliding means has a drive ratio equal to the pitch of said threads on said threaded shaft.

3. A device as set forth in claim 1, further characterized in that the drive between said elongated member and said sliding means has a drive ratio greater than the pitch of said threads on said threaded shaft.

References Cited

UNITED STATES PATENTS

| | | | |
|---|---|---|---|
| 749,046 | 1/1904 | Folmer et al. | 350—139 |
| 2,360,268 | 10/1944 | Ott | 350—84 |
| 2,581,865 | 1/1952 | Kershaw et al. | 350—76 |
| 2,811,895 | 11/1957 | Jensen | 350—76 |
| 3,029,696 | 4/1962 | Schmidt | 350—72 |

DAVID SCHONBERG, Primary Examiner.

T. H. KUSMER, Assistant Examiner.

U.S. Cl. X.R.

350—248